Patented Oct. 12, 1954

2,691,651

UNITED STATES PATENT OFFICE 2,691,651

PREPARATION OF ALKALI METAL AND ALKALINE EARTH METAL PENICILLINATES

John C. Sheehan, Arlington Heights, Mass., and Max Tishler, Westfield, N. J., assignors to Merck & Co., Inc., Rahway, N. J., a corporation of New Jersey No Drawing. Original application October 17, 1947, Serial No. 780,588. Divided and this application August 9, 1949, Serial No. 109,415

8 Claims. (Cl. 260—239.1)

This invention is concerned generally with novel processes for manufacturing therapeutically valuable salts of penicillin G. More particularly it relates to an improved method for the preparation of alkali and alkaline earth metal salts of penicillin G in substantially pure form and in good yield from readily available starting materials.

This application is a division of our co-pending application Serial No. 780,588, filed October 17, 1947, now abandoned.

When penicillin G is prepared by microbiological fermentation processes, it is obtained in aqueous solution admixed with various other penicillins. Since penicillin G is superior to the other penicillins in the treatment of certain diseases, it is important to be able to prepare salts of said penicillin G, in substantially pure form, uncontaminated by the other penicillins. The preferred salts for therapeutic administration are the alkali and alkaline earth metal salts, specifically the sodium or calcium salts of penicillin G.

Penicillin G can be separated from a mixture containing penicillin G admixed with other penicillins, in the form of a substantially pure amine salt. However, previously known methods for interconverting penicillin salts involve acidification of an aqueous solution of said salt, extraction into a solvent of the acid form of penicillin G, and transfer to aqueous solution by treatment with the base corresponding to the desired cation. This and similar procedures subject the penicillin to strongly acid and basic treatment in aqueous solution, under which conditions penicillin is easily destroyed.

It has been discovered, however, that alkali and alkaline earth metal salts of penicillin G can be easily prepared from said amine salts in practically quantitative yield and using only substantially neutral reagents. This is accomplished by metathetically reacting the amine salt of penicillin G and an alkali metal or alkaline earth metal salt in solution in an organic liquid. Since metal salts of penicillin G are substantially insoluble in organic liquids, the metal salt of penicillin G, formed by the above reaction, ordinarily precipitates and may be recovered by conventional means. Penicillin G is stable under the conditions employed in this reaction. Previously, it has always been considered necessary to carry out the interconversion of penicillin salts by processes employing refrigeration. When the present process is used, it is possible to carry out the reaction at a temperature of 25° C., or even higher, without appreciable decomposition of penicillin G. Furthermore, the present invention accomplishes the conversion to the important sodium salt and other alkali metal salts of penicillin G without use of the expensive freeze-drying step.

The starting materials herein employed include the salts of penicillin G with alkyl amines, for example, trimethyl amine, triethyl amine, and the like, or with heterocyclic amines, for example, N-methyl-piperidine, N-ethyl-piperidine, N-methyl morpholine, N-ethyl morpholine, and the like. Applicants prefer to use the tertiary amine salts of penicillin G since these compounds are readily prepared in pure form.

Any substantially anhydrous, substantially neutral polar organic liquid, which is non-reactive with the penicillin G, can be employed as the reaction solvent, since liquids of this class have a solvent action on the amine salts of penicillin G and on the alkali and alkaline earth metal salt reactants. It is ordinarily preferred to employ chlorinated solvents, such as chloroform, $\beta,\beta'$-dichloro-dialkyl ethers, and the like, nitroparaffins, such as nitromethane, dialkylketones, such as acetone, methylethyl ketone, and the like, esters, such as ethyl acetate, alcohols, such as butanol, 2-ethyl butanol, and the like, nitriles, such as acetonitrile, as well as mixtures containing two or more different solvents.

Any alkali or alkaline earth metal salt can be used, providing that the anion of said salt is non-reactive with penicillin G, since salts of this class yield a solution containing the corresponding cations when mixed with polar organic liquids. The reaction is best conducted, however, utilizing alkali metal or alkaline earth metal salts having a solubility in the organic liquid employed, substantially greater than the solubility of the corresponding metal salt of penicillin G. When an alkali metal or alkaline earth metal salt reactant of the above class is reacted with an amine salt of penicillin G, employing merely sufficient organic liquid to produce a substantially saturated solution of said metal salt reactant, the corresponding metal salt of penicillin G formed by metathesis necessarily precipitates, and the reaction proceeds, due to mass action, substantially to completion. The metal salts which are ordinarily utilized include alkali metal and alkaline earth metal halides, such as sodium iodide, potassium iodide, lithium chloride, calcium bromide, and the like, alkali metal salts of aliphatic carboxylic acids, such as sodium acetate, which is conveniently used in the form of its hydrate, sodium 2-ethyl hexoate, potassium 2-ethyl hexoate, and the like, and alkali thiocyanates.

The reaction is conveniently carried out by adding a solution of one of the reactants, with stirring, to a solution containing the other reactant, under which conditions the alkali metal or alkaline earth metal salt of penicillin G, formed by the reaction, ordinarily precipitates and can be recovered by conventional means. The crystalline alkali metal or alkaline earth metal salt of penicillin G is ordinarily recovered by filtration or centrifugation and is washed thoroughly with the reaction solvent or other substantially anhydrous organic liquid which is a solvent for the by-product amine salt formed by the metathesis. The product can then be dried at room temperature or above, but preferably in vacuo, to produce, in substantially pure form, the alkali metal or alkaline earth metal salt of penicillin G. The product can be further purified, if desired, by recrystallization, from a solvent, such as an aqueous dialkyl ketone.

The following examples illustrate methods of carrying out the present invention, but it is to be understood that these examples are given by way of illustration and not of limitation.

Example 1

A solution of 5 g. of the N-ethylpiperidine salt of penicillin G in 30 ml. of chloroform was added to a solution of 1.68 g. of sodium iodide in 30 ml. of acetone. Crystallization began immediately; after two days the colorless crystalline sodium penicillin G was filtered off, washed thoroughly with acetone and dried in vacuo, weight 3.84 g.; yield 96% of theory; bioassay 1654 u./mg. against *S. aureus*; $(\alpha)_D^{23} = +285°$. Anal. Calc'd for $C_{16}H_{17}O_4N_2SNa$; C, 53.93; H, 4.81; N, 7.86. Found: C, 54.05; H, 4.84; N, 7.72.

Example 2

A solution of 100 g. of the N-ethylpiperidine salt of penicillin G in 500 ml. of chloroform was added to a solution of 33.2 g. of sodium 2-ethylhexoate in 1500 ml. of acetone, with cooling to maintain the temperature between about 25° C. and 30° C. After one hour the crystalline sodium salt of penicillin G was collected by filtration, washed with acetone and dried. Weight 76.6 g.; yield 96.3% of theory. The optical rotation was $(\alpha)_D^{23} = +302°$.

If desired, the product may be recrystallized from aqueous acetone. To a solution of 70 g. of sodium penicillin G in 280 ml. of acetone-water (prepared by mixing 88 ml. acetone and 12 ml. water) was added 2030 ml. of dry acetone. After one hour the pure crystalline sodium penicillin G which crystallized was collected by filtration, washed with acetone and dried; weight 66.7 g.; yield 95.5% of theory, optical rotation $$(\alpha)_D^{23} = +300°$$

Anal. Calc'd for $C_{16}H_{17}O_4N_2SNa$; C, 53.93; H, 4.81; N, 7.86. Found: C, 53.90; H, 4.77; N, 7.75.

Example 3

A solution of 5 g. of the N-ethylpiperidine salt of penicillin G in 23 ml. of chloroform was added to a solution of 1 g. of sodium thiocyanate in 23 ml. of acetone. After one hour the crystalline sodium penicillin G was collected by filtration, washed with acetone, and dried; weight 3.78 g.; yield 95%.

Example 4

A solution of 0.7 g. of the triethylamine salt of penicillin G in 3 ml. of chloroform was added to a solution of 0.265 g. of sodium iodide in 12 ml. of acetone. After one hour the crystalline sodium penicillin G was collected by filtration, washed with acetone and dried; weight 0.56 g.; yield 97.8%.

Example 5

A solution containing about 1.0 g. of the N-ethylpiperidine salt of penicillin G dissolved in about 5 ml. of chloroform was added slowly to a saturated acetone solution of lithium chloride containing about 0.0952 g. of LiCl. Upon scratching the sides of the beaker the lithium salt of penicillin G crystallized and was recovered by filtration, washed with acetone, and dried.

Example 6

A solution containing about 1.0 g. of the N-ethylpiperidine salt of penicillin G dissolved in about 5 ml. of chloroform was added slowly to a saturated acetone solution of calcium bromide containing about 0.446 g. of $CaBr_2$. The calcium salt of penicillin G precipitated and was recovered by filtration, washed with acetone and dried.

Example 7

A solution of 1.1 g. of sodium 2-ethylhexoate in 20 cc. of acetone was added to a solution of 1 g. of the N-ethylpiperidine salt of penicillin G in 5 cc. of chloroform and the resulting mixture was shaken occasionally over a 1 hour period. The crystalline sodium penicillin which precipitated was recovered by filtration and dried. Analysis indicated the product to be approximately 94–96% pure sodium penicillin G.

Example 8

About 1.1 g. of sodium 2-ethylhexoate was dissolved in 20 cc. of methyl ethyl ketone and the solution was added to a solution of 1 g. of the N-ethylpiperidine salt of penicillin G in 5 cc. of chloroform, and the mixture was shaken occasionally over a 1 hour period. The crystalline sodium penicillin G which precipitated was recovered by filtration and dried. Analysis indicated that the product was approximately 95% pure sodium penicillin G.

Example 9

1.1 g. of sodium 2-ethylhexoate was dissolved in 20 cc. of ethyl acetate, the solution was added to a solution of 1 g. of the N-ethyl-piperidine salt of penicillin G in 5 cc. of chloroform, and the mixture was shaken occasionally over a 1 hour period. The crystalline sodium penicillin G which precipitated was recovered by filtration and dried and was found to be approximately 94–96% pure sodium penicillin G.

Example 10

1.1 g. of sodium 2-ethylhexoate was dissolved in 20 cc. of 2-ethyl butanol, the solution was added to a solution containing 1 g. of the N-ethylpiperidine salt of penicillin G, and the mixture was shaken occasionally over a 1 hour period. The crystalline sodium penicillin G, which precipitated, was recovered by filtration and dried. Analysis indicated that the sodium salt thus produced was 94–96% pure sodium penicillin G.

Example 11

A solution of 1.1 g. of sodium 2-ethylhexoate in 20 cc. of butanol was added to a solution of 1 g. of the N-ethyl-piperidine salt of penicillin G in 5 cc. of chloroform, and the mixture shaken occasionally over a 1 hour period. The crystalline sodium penicillin G which precipitated was recovered by filtration and dried and was found by analysis to be 94–96% pure sodium penicillin G.

Example 12

1.1 g. of sodium 2-ethylhexoate was dissolved in 20 cc. of β,β'-dichloro-diethyl ether, the solution was added to a solution containing 1 g. of the N-ethyl-piperidine salt of penicillin G in 5 cc. of chloroform and the mixture was shaken occasionally over a 1 hour period. The crystalline sodium penicillin G which precipitated was recovered by filtration and dried. Analysis indicated the product to be 94–96% pure sodium penicillin G.

Example 13

A solution of 1.1 g. of sodium 2-ethylhexoate in 20 cc. of acetonitrile was added to a solution of 1 g. of the N-ethyl-piperidine salt of penicillin G in 5 cc. of chloroform, and the resulting mixture was shaken occasionally over a 1 hour period. The crystalline sodium penicillin G which precipitated was recovered by filtration and dried and was found by analysis to be 94–96% pure sodium penicillin G.

Example 14

1.1 g. of sodium 2-ethylhexoate was added to a solution containing 1 g. of the N-ethyl-piperidine salt of penicillin G dissolved in 5 cc. of chloroform, and the resulting mixture was shaken occasionally over a 1 hour period. During this time the sodium 2-ethylhexoate went into solution and sodium penicillin G crystallized. This crystalline product was recovered by filtration and dried and was found by analysis to be 94–96% pure sodium penicillin G.

Example 15

A solution of 1.1 g. of sodium 2-ethylhexoate in 20 cc. of acetone was added to a solution containing 1 g. of the N-ethyl-piperidine salt of penicillin G in 25 cc. of nitromethane, and the resulting mixture was shaken occasionally over a 1 hour period. The crystalline sodium penicillin G which precipitated was recovered by filtration and dried. Analysis indicated that the product was approximately 80–85% pure sodium penicillin G. This produce is purified, if desired by recrystallization from aqueous acetone.

Example 16

1.1 g. of sodium 2-ethylhexoate was dissolved in 20 cc. of methyl ethyl ketone, the solution was added to a solution of 1 g. of the N-ethyl-piperidine salt of penicillin G in 25 cc. of nitromethane, and the resulting mixture shaken occasionally over a 1 hour period. The crystalline sodium penicillin G which precipitated was recovered by filtration and dried. Analysis indicated that this product was 80–85% pure sodium penicillin G, which may be further purified, if desired, by recrystallization from aqueous methyl ethyl ketone.

Example 17

1.1 g. of sodium 2-ethylhexoate was dissolved in 20 cc. of 2-ethyl butanol, the solution was added to a solution containing 1 g. of the N-ethyl-piperidine salt of penicillin G dissolved in 25 cc. of nitromethane, and the resulting mixture was shaken occasionally over a 1 hour period. The crystalline sodium penicillin G, which precipitated, was recovered by filtration and dried. The sodium salt, thus produced, was found by analysis to be approximately 85% pure sodium penicillin G.

Example 18

1.1 g. of sodium 2-ethylhexoate was dissolved in 20 cc. of ethyl acetate and the solution added to a solution containing 1 g. of the N-ethyl piperidine salt of penicillin G dissolved in 25 cc. of nitromethane. The resulting mixture was shaken over a 1 hour period, and the crystalline sodium penicillin G which precipitated was recovered by filtration and dried. Analysis showed this product to be approximately 80–85% pure sodium penicillin G.

Example 19

A solution of 1.1 g. of sodium 2-ethylhexoate in 20 cc. β,β'-dichloro-diethyl ether was added to a solution containing 1 g. of the N-ethyl piperidine salt of penicillin G dissolved in 25 cc. of nitromethane, and the resulting mixture was shaken occasionally over a 1 hour period. The crystalline product which precipitated was recovered by filtration and dried. Analysis showed this material to be approximately 80–85% pure sodium penicillin G.

Example 20

1.1 g. of sodium 2-ethylhexoate was dissolved in 20 cc. of acetonitrile and the solution was added to a solution containing 1 g. of the N-ethyl-piperidine salt of penicillin G in 25 cc. of nitromethane. The resulting solution was shaken occasionally over a 1 hour period. The crystalline product which precipitated was recovered by filtration and dried and was found by analysis to be 80–85% pure sodium penicillin G. This product can be further purified, if desired by recrystallizing from a solvent, such as aqueous acetone.

Example 21

2.55 gm. of anhydrous sodium acetate was dissolved in 1.7 g. of water to form sodium acetate hydrate and this material was dissolved in 210 cc. of butanol by heating to 60–70° C. To this was added a slurry of 1.40 g. of the N-ethyl piperidine salt of penicillin G in 100 cc. butanol and the whole stirred over a 1 hour period. The crystalline sodium penicillin G, thus produced, was recovered by filtration and dried.

Example 22

2.55 gm. of anhydrous sodium acetate was dissolved in 1.7 g. of water to form the hydrate and this material was dissolved in 210 cc. of butanol by heating to 60–70° C. To this was added a slurry of 14.0 g. of the cyclohexyl amine salt of penicillins (predominantly G) in 100 cc. butanol and the whole stirred over a 1 hour period. The crystalline sodium penicillin, thus produced, was recovered by filtration and dried.

Modifications may be made in carrying out the present invention without departing from the spirit and scope thereof. Insofar as these changes and modifications are within the purview of the annexed claims, they are to be considered as part of our invention.

We claim:

1. The process of preparing alkali metal salts of penicillin G which comprises metathetically reacting, in solution in a substantially anhydrous organic solvent, an amine salt of penicillin G and an alkali metal halide having a solubility in said organic solvent substantially greater than the solubility of the corresponding alkali metal salt of penicillin G.

2. The process of preparing alkaline earth metal salts of penicillin G which comprises metathetically reacting, in solution in a substantially anhydrous organic solvent, an amine salt of penicillin G and an alkaline earth metal halide having a solubility in said organic solvent substantially greater than the solubility of the corresponding alkaline earth metal salt of penicillin G.

3. The process of preparing the sodium salt of penicillin G which comprises reacting the N-ethyl-piperidine salt of penicillin G with sodium iodide, said reaction being carried out in solution in a substantially anhydrous solvent comprising acetone and chloroform.

4. The process of preparing the lithium salt of penicillin G which comprises reacting the N-ethyl-piperidine salt of penicillin G with lithium chloride, said reaction being carried out in solution in a substantially anhydrous solvent comprising chloroform.

5. The process of preparing the calcium salt of penicillin G which comprises reacting the N-ethyl-piperidine salt of penicillin G with calcium bromide, said reaction being carried out in solution in a substantially anhydrous organic solvent comprising chloroform.

6. Process for the formation of an alkali metal salt of penicillin which comprises metathetically reacting an amine salt of penicillin and an alkali metal halide in a polar organic solvent solution.

7. Process for the formation of sodium penicillin which comprises metathetically reacting triethylamine salt of penicillin with sodium iodide in a polar organic solvent solution.

8. Process for the formation of alkali metal and alkaline earth metal salts of penicillin which comprises metathetically reacting an amine salt of penicillin and a metal halide selected from the group consisting of alkali metal halides and alkaline earth metal halides in a polar organic solvent solution.

References Cited in the file of this patent

UNITED STATES PATENTS

| Number | Name | Date |
|---|---|---|
| 2,493,625 | Goldberg et al. | Jan. 3, 1950 |